US009926869B2

(12) United States Patent
Lorenz et al.

(10) Patent No.: US 9,926,869 B2
(45) Date of Patent: Mar. 27, 2018

(54) METHOD FOR ADAPTING TRANSITION COMPENSATION

(71) Applicant: Robert Bosch GmbH, Stuttgart (DE)

(72) Inventors: Marko Lorenz, Grossbottwar (DE); Andreas Posselt, Muehlacker (DE); Andrea Krusch, Ludwigsburg (DE); Andreas Gutscher, Markgroeningen (DE); Haris Hamedovic, Moeglingen (DE)

(73) Assignee: Robert Bosch GmbH, Stuttgart (DE)

( * ) Notice: Subject to any disclaimer, the term of this patent is extended or adjusted under 35 U.S.C. 154(b) by 50 days.

(21) Appl. No.: 14/783,128

(22) PCT Filed: Feb. 12, 2014

(86) PCT No.: PCT/EP2014/052709
§ 371 (c)(1),
(2) Date: Oct. 8, 2015

(87) PCT Pub. No.: WO2014/166654
PCT Pub. Date: Oct. 16, 2014

(65) Prior Publication Data

US 2016/0084183 A1 Mar. 24, 2016

(30) Foreign Application Priority Data

Apr. 12, 2013 (DE) ........................ 10 2013 206 551

(51) Int. Cl.
*B60T 7/12* (2006.01)
*F02D 41/04* (2006.01)
(Continued)

(52) U.S. Cl.
CPC ....... *F02D 41/047* (2013.01); *F02D 41/2454* (2013.01); *F02D 41/263* (2013.01);
(Continued)

(58) Field of Classification Search
CPC .. F02D 41/047; F02D 41/2454; F02D 41/263; F02D 41/3011; F02D 41/3064;
(Continued)

(56) References Cited

U.S. PATENT DOCUMENTS 4,357,923 A * 11/1982 Hideg .................. F02D 41/047 123/480
4,741,311 A * 5/1988 Nakajima ............ F02D 41/107 123/675

(Continued)

FOREIGN PATENT DOCUMENTS

CN 1423041 A 6/2003
CN 101765709 A 6/2010

(Continued)

*Primary Examiner* — Hung Q Nguyen
*Assistant Examiner* — Anthony Taylor, Jr.
(74) *Attorney, Agent, or Firm* — Norton Rose Fulbright US LLP; Gerard Messina

(57) ABSTRACT

A method for adapting a transition compensation based on a lambda value change for operating an engine, which includes a combustion chamber having a first inlet opening connected to a first intake pipe having a first injector. The chamber includes a second inlet opening connected to a second intake pipe having a second injector. During normal operation, a predetermined fuel quantity is injected, and this quantity includes a first and second fuel quantities to be injected respectively via the first and second openings. In a first step, the first injector remains closed, and in a second step, the first injector is opened again. In the second step, a first test fuel quantity is injected into the combustion chamber via the first opening and a second test fuel quantity is injected via the second opening, the first and second test fuel quantities making up the predetermined fuel quantity.

8 Claims, 3 Drawing Sheets

(51) Int. Cl.
*F02D 41/24* (2006.01)
*F02D 41/30* (2006.01)
*F02D 41/26* (2006.01)

(52) U.S. Cl.
CPC ...... *F02D 41/3011* (2013.01); *F02D 41/3064* (2013.01); *F02D 41/3094* (2013.01)

(58) Field of Classification Search
CPC ............. F02D 41/3094; F02D 41/0085; F02D 2250/32
USPC .......................................................... 701/103
See application file for complete search history.

(56) References Cited

U.S. PATENT DOCUMENTS

| | | | | | |
|---|---|---|---|---|---|
| 5,239,974 | A * | 8/1993 | Ebinger | F02D 41/047 | 123/492 |
| 5,243,948 | A * | 9/1993 | Schnaibel | F02D 41/047 | 123/492 |
| 5,553,593 | A * | 9/1996 | Schnaibel | F02D 41/047 | 123/682 |
| 5,819,714 | A * | 10/1998 | Bush | F02D 41/047 | 123/480 |
| 6,912,997 | B2 * | 7/2005 | Mezger | F02D 41/047 | 123/480 |
| 6,951,205 | B2 * | 10/2005 | Joos | F02D 41/0025 | 123/179.16 |
| 6,951,210 | B2 * | 10/2005 | Landi | F02D 19/02 | 123/525 |
| 7,278,396 | B2 * | 10/2007 | Leone | F01N 11/00 | 123/431 |
| 7,287,492 | B2 * | 10/2007 | Leone | F01N 13/009 | 123/1 A |
| 7,461,632 | B2 * | 12/2008 | Raimann | F02D 41/0002 | 123/431 |
| 7,472,679 | B2 * | 1/2009 | Yamashita | F02B 31/02 | 123/302 |
| 7,474,955 | B2 * | 1/2009 | Wittefeldt | F02D 41/02 | 123/679 |
| 7,581,528 | B2 * | 9/2009 | Stein | F02D 19/0628 | 123/304 |
| 7,594,498 | B2 * | 9/2009 | Lewis | F01N 11/002 | 123/431 |
| 7,640,912 | B2 * | 1/2010 | Lewis | F01N 11/007 | 123/299 |
| 7,647,916 | B2 * | 1/2010 | Leone | F02M 26/01 | 123/25 E |
| 7,953,542 | B2 * | 5/2011 | Plagge | F02D 41/047 | 123/492 |
| 8,286,618 | B2 * | 10/2012 | Michalske | F02D 41/1438 | 123/676 |
| 2007/0034192 | A1 * | 2/2007 | Kamio | F02B 47/02 | 123/478 |
| 2012/0125289 | A1 | 5/2012 | Mori | | |

FOREIGN PATENT DOCUMENTS

| | | | |
|---|---|---|---|
| DE | 102 52 214 | | 5/2004 |
| DE | 10 2007 005 381 | | 8/2008 |
| DE | 10 2009 000269 | | 8/2009 |
| DE | 10 2009 036530 | | 2/2011 |
| EP | 2034207 | A2 | 3/2009 |
| JP | S6022033 | A | 2/1985 |
| JP | S6338637 | A | 2/1988 |
| JP | H01294929 | A | 11/1989 |
| JP | 2004027996 | A | 1/2004 |
| JP | 2005023863 | A | 1/2005 |
| JP | 2006258049 | A | 9/2006 |
| JP | 2007154881 | A | 6/2007 |
| JP | 2009074419 | A | 4/2009 |
| JP | 2009180171 | A | 8/2009 |
| JP | 2009197690 | A | 9/2009 |
| JP | 2012036757 | A | 2/2012 |
| RU | 2282738 | A | 3/2004 |
| WO | 2006027853 | A1 | 3/2006 |
| WO | 2012089389 | A1 | 7/2012 |

* cited by examiner

METHOD FOR ADAPTING TRANSITION COMPENSATION

FIELD OF THE INVENTION

The present invention relates to an internal combustion engine.

BACKGROUND INFORMATION

Such internal combustion engines are understood in general and are operated by supplying an air-fuel mixture to the combustion chamber during the intake stroke. To create the air-fuel mixture, fuel injectors inject and atomize a predetermined fuel quantity into an intake pipe, which is connected to the combustion chamber via an inlet opening. A throttle valve situated in the intake pipe determines the quantity of fresh air to be aspirated in the direction of the combustion chamber. Opening of the throttle valve causes an increase in pressure in the intake pipe, thereby reducing the evaporation tendency of the injected fuel. Together with fuel sprayed by the injector onto the intake pipe wall, fuel is also deposited on the intake pipe wall because of the reduced evaporation tendency when the throttle valve is opened. In the case of closing of the throttle valve, the pressure in the intake pipe declines, the evaporation tendency increases and fuel deposited on the wall evaporates into the intake pipe, whereby the air-fuel mixture is enriched. In both cases, the fuel quantity supplied to the combustion chamber or the actual fuel quantity differs from the fuel quantity provided or the setpoint fuel quantity.

It is therefore believed to be understood in general that the fuel quantity provided, which is injected into the intake pipe, is to be adjusted, so that losses or additional fuel quantities, resulting from the deposition of fuel on the wall, for example, are compensated for in the event of a load change.

This procedure is referred to as transition compensation and is discussed in DE 10 2007 005 381 A1, for example. Within the scope of an economically and ecologically meaningful transition compensation, it is necessary, on the one hand, to know how great the change in fuel quantity required for the compensation for the particular operating situation should be and, on the other hand, to utilize this knowledge to correct the predetermined fuel quantity independently of operating parameters, such as the intake pipe pressure, for example. The more accurate the knowledge of the necessary change in the fuel quantity for the transition compensation, the more accurate will be the adaptation of the transition compensation. If there is no transition compensation or if it is wrong, there is the risk that the air-fuel mixture in the combustion chamber will become too rich or too lean. Under these circumstances, there may then be a power dip or even misfiring may occur. On the other hand, the accurate determination of the fuel quantity required for the transition compensation allows low-emission and uniform operation of the internal combustion engine.

To determine the compensation quantity, the property of the wall film in the intake pipe may be used. The fuel quantity deposited and thus the property of the wall film, in particular its thickness, depend on numerous parameters such as the intake pipe temperature, the intake pipe pressure and the rotational speed, for example. It is therefore advantageous to know the property of the wall film as a function of these parameters, in particular for various operating situations, and to be able to adapt the transition compensation under various conditions with knowledge of this dependence. It is customary here to control the injected fuel quantity with the aid of a control device or with the aid of a control unit as a function of the operating situation and thereby take into account the corresponding required transition compensation, in particular in the event of sudden load variations.

If the individual dependence of the change in the fuel to be injected required for the transition compensation as a function of various parameters is known, in particular the intake pipe pressure for each internal combustion engine, and if the transition compensation has been adapted for each operating situation, the possibility cannot be ruled out that the change in the fuel quantity required for the transition compensation will itself change over time. In fact it should instead be assumed that the property of the wall film and thus also the change in fuel quantity required for the transition compensation, for example, will change over time due to impurities in the intake pipe or the like. Compensation of such variations requires that the transition compensations must be adapted again in order to ensure what may be a low-emission operation of the internal combustion engine. Repeated adaptation of the transition compensation using methods from the related art is thus both expensive and time-consuming and is associated with great complexity.

SUMMARY OF THE INVENTION

The method according to the present invention for adapting the transition compensation for an internal combustion engine according to the main claim has the advantage over the related art that the deviations from the fuel quantity provided for the combustion chamber may be inferred inexpensively and without any great additional effort.

It is provided according to the present invention that, in a first method step, fuel is injected into one of the intake pipes (i.e., the first intake pipe) leading to the combustion chamber. At the same time, during the first method step, a substitute fuel quantity is supplied to the combustion chamber via the second intake pipe or via multiple other intake pipes, this fuel quantity corresponds to the fuel quantity which is injected into both or all intake pipes during normal operation.

During the first method step, fuel deposited on the first intake pipe wall evaporates and enriches the air-fuel mixture, which is conveyed into the combustion chamber.

The enriching of the air-fuel mixture occurring during the first method step may be detected on the basis of the change in a lambda value, i.e., on the basis of a lambda value change. A lambda sensor which may be situated at the outlet of the combustion chamber or of the plurality of combustion chambers present in the internal combustion engine or in the exhaust tract ascertains the lambda value, which quantifies the residual oxygen content in the exhaust gas emerging from the combustion chamber. In particular, a fat excursion, i.e., a decrease with a subsequent increase of the lambda value, is observable during the first method step.

In a second method step, the first test fuel quantity is injected by the first injector into the first intake pipe, and the second test fuel quantity is injected by the second injector into the second intake pipe. The sum of the first and second fuel quantities corresponds to the predetermined fuel quantity during normal operation or the substitute fuel quantity. As a result, fuel is deposited on the first intake pipe wall, and the air-fuel mixture supplied to the combustion chamber is leaner. The lambda value change increases during the second method step in the form of a lean excursion, i.e., the lambda value initially increases and then decreases again.

The size and duration of the fat and lean excursions are a measure of the quantitative difference between the actual fuel quantity and the setpoint fuel quantity in the combustion chamber. Therefore, according to the present invention, the lambda value changes observed for the particular operating situation are used to adapt the transition compensation. The use of a lambda sensor, which is generally already present in the internal combustion engine, is advantageous according to the present invention, because this makes it possible to omit the use of an additional detection arrangement, which entail additional costs, for example, a detection arrangement which ascertain the property of the wall film. In addition, the method according to the present invention offers the advantage that not only those deviations from the setpoint fuel quantity, which result from the deposition of the fuel on the intake pipe wall, are taken into account, but also those arising from other potential causes are taken into account.

In one specific embodiment of the present invention, the first and second fuel quantities and/or, in the second method step, the first and second test fuel quantities are injected in equal parts into the intake pipe under normal conditions. It is advantageous that the injectors may be of the same design, thereby preventing additional costs, which arise due to the production of an additional type of injector.

If the method is repeated for different operating situations, an overview is obtained about the deviations of actual and setpoint fuel quantities as a function of all possible operating situations, and the transition compensation is adaptable for each operating situation. In one specific embodiment of the present invention, it is then provided to generate an engine characteristics map which assigns the adapted transition compensation to the particular operating situation. In particular it is then provided to correct the fuel quantity to be injected for each operating situation via a control program, for example, a DOE program. One particular advantage of this specific embodiment is to operate the internal combustion engine with particularly low emissions under various operating situations and to ensure the uniform operation of the internal combustion engine.

In another specific embodiment of the present invention, the lambda value change is ascertained at the start of the first method step and/or at the start of the second method step. If the lambda value change is detected only at the start of the first or only at the start of the second method step, then the evaluation effort of the lambda sensor is advantageously reducible. If the lambda value change is established both at the start of the first and at the start of the second method step, then it is possible to increase the measuring accuracy.

According to another specific embodiment of the present invention, it is provided to carry out the first and second method steps during operational use, i.e., to ascertain the deviation from the setpoint fuel quantity provided for the combustion chamber, and to use it for adapting the transition compensation. Operational use is understood to be an operation which does not serve test purposes exclusively. It is particularly advantageous here that it is omitted to test all conceivable operating situations in advance in a time-consuming process and subsequently generate the engine characteristics map. Instead, it is provided to successively ascertain the engine characteristics map of the actual and setpoint fuel quantities, i.e., the property of the wall film, in that the pre-existing engine characteristics map is expanded or corrected by an adapted transition compensation as soon as the internal combustion engine is being operated under an operating situation not previously taken into account.

In another specific embodiment of the present invention, after a predefined time period, the transition compensation is adapted again for various operating situations. If the dependence of the property of the wall film or the deviation from the fuel quantity provided for the combustion chamber of the internal combustion engine has changed for an operating situation, then the newly adapted transition compensations replace those used up to that point in time.

In another specific embodiment of the present invention, the internal combustion engine automatically switches to a test phase (i.e., the first and second method steps are carried out) at the next possible opportunity as soon as it is established that its emission changes, in particular worsens, after the combustion process. For example, a worsening could manifest itself on the basis of a deviation from the setpoint value of the lambda value or also on the basis of a worsening of an exhaust gas value during normal operation. In the test phase, the property of the wall film is ascertained under various possible operating situations according to one of the previous methods, and subsequently the transition compensation is adapted again.

Exemplary embodiments of the present invention are depicted in the drawings and explained in greater detail in the following description.

DETAILED DESCRIPTION

Figure 1:
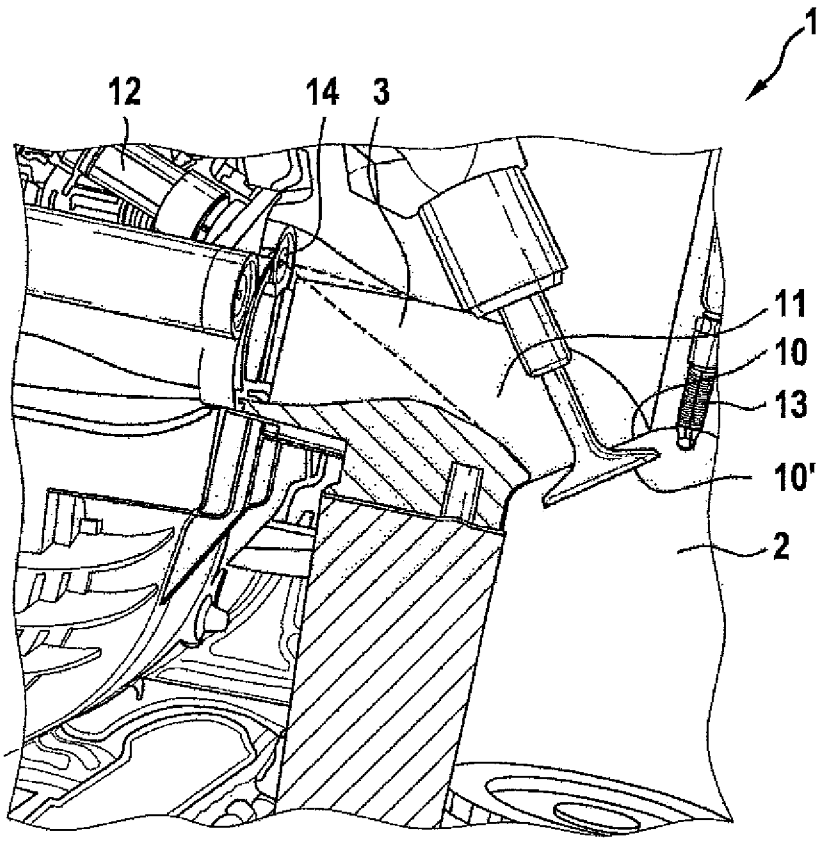
FIG. 1 shows an illustration of a part of an internal combustion engine.

FIG. 1 shows an illustration of a part of an internal combustion engine 1, including a combustion chamber 2, an injector 12, an inlet valve 10', an ignition arrangement 13, an injector orifice 14, an inlet opening 10 and a first intake pipe 11, while fuel 3 is injected into first intake pipe 11 in the direction of the combustion chamber, a second intake pipe also being provided (not shown in FIG. 1). During injection in the form of spray cones, the fuel is atomized, which is represented with the aid of a broken line in FIG. 1. This representation shows that in a realistic specific embodiment of an internal combustion engine 1, fuel 3 is also sprayed against the intake pipe wall 11 during injection.

Figure 2A:
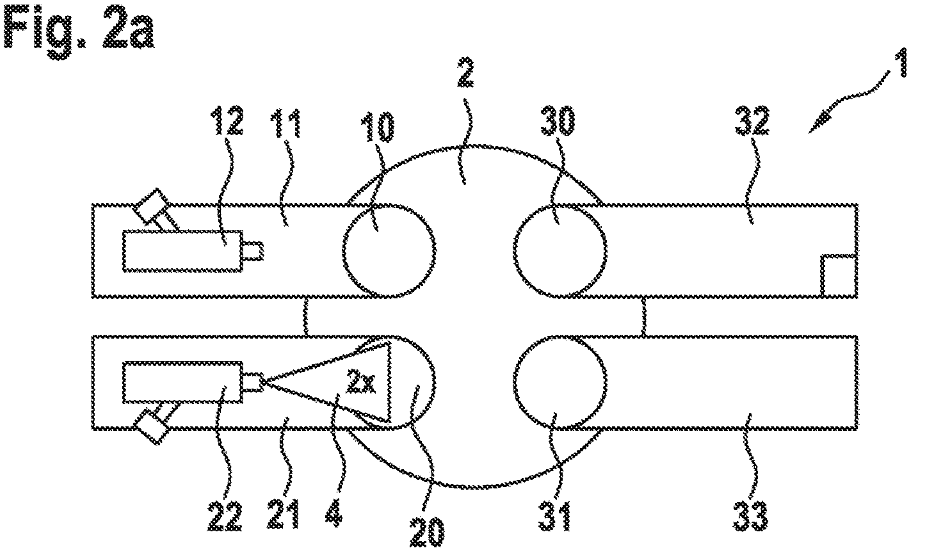
FIG. 2*a* shows a schematic representation of a part of the internal combustion engine, which carries out a first method step of a method according to an exemplary specific embodiment of the present invention.
Figure 2B:
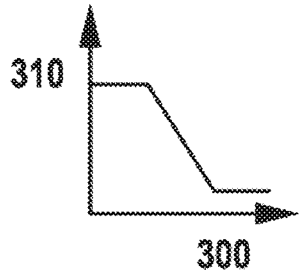
FIG. 2*b* and FIG. 2*c* show the change over time of a deposited fuel quantity.
Figure 2C:
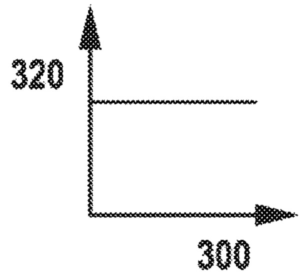

FIG. 2*a* and FIG. 2*b* show a schematic representation of a part of internal combustion engine 1, which carries out a first method step of a method according to an exemplary specific embodiment of the present invention. The internal combustion engine includes combustion chamber 2, a first and second intake pipe 11 and 21 and at least one injector per intake pipe, i.e., at least two injectors 12, 22. Combustion chamber 2 is configured in such a way that a piston (not shown in the figure) is able to move therein, and the wall of the combustion chamber has two intake ports 10, 20, through which an air-fuel mixture is drawn in, and two exhaust ports 30, 31, from which the raw exhaust gases are expelled out of combustion chamber 2 into exhaust pipes 32, 33 after the combustion process of the air-fuel mixture. A lambda sensor, which is capable of ascertaining the residual oxygen content of the exhaust gas, is usually situated at the outlet of combustion chamber 2. During normal operation, a predetermined fuel quantity is injected in the direction of corresponding inlet openings 10, 20 into intake pipes 11, 21 from the two injectors 12, 22, thereby forming a fuel-air mixture together with the aspirated air in the corresponding intake pipe. The quantity of the aspirated air is varied by a throttle valve. For example, if internal combustion engine 1 is to make available an elevated torque, the throttle valve opens. In this case, the pressure in intake pipe 11, 21 increases, the evaporation tendency of the fuel declines and a portion of the fuel is deposited on the wall. Together with fuel sprayed against the wall during injection, the fuel deposited on the wall is missing from the fuel-air mixture when it is supplied to combustion chamber 2. When the throttle valve closes, the intake pipe pressure drops, the evaporation tendency of the fuel increases, the fuel deposited on the intake pipe wall evaporates into the volume of the intake pipe and is finally additionally supplied to combustion chamber 2. Therefore, the fuel quantity provided must be expected not to reach the combustion chamber during both opening and closing. The fuel quantity supplied to the combustion chamber differs from the setpoint fuel quantity. To also take into account fuel changes resulting from, for example, the deposition of fuel on intake pipe wall 11, 21, in predetermination of the fuel to be injected, it is necessary to know the difference between the setpoint fuel quantity and the actual fuel quantity.

FIG. 2 shows a first method step, in which a first injector 12 is closed over at least one entire cycle, so that no fuel is injected into first intake pipe 11, and the wall film regresses on its wall. At the same time, second injector 22 injects a substitute fuel quantity 4 into second intake pipe 21, the quantity of which corresponds precisely to the fuel quantity which would be injected by the two fuel injectors together during normal operation (illustrated by 2x printed in bold in the figure). FIG. 2*b* shows that during the first method step, the deposition of fuel on the first intake pipe wall 310 decreases over time 300. However, the deposition of fuel on second intake pipe wall 320 remains constant over time 300, as represented in FIG. 2*c*.

Figure 2D:
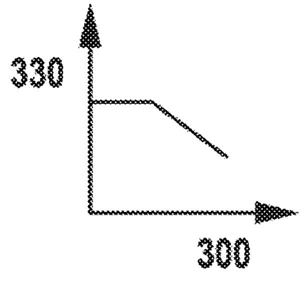
FIG. 2*d* shows the change over time of a lambda value.

With the aid of the lambda sensor, it is determined that measured lambda value 330 initially decreases over time 300 during the regress of the wall film and subsequently returns back to the lambda value which the lambda sensor has measured before the closing of the injector. The brief decrease and the subsequent increase of the lambda value, i.e., this lambda value change, is referred to as a fat excursion and is illustrated in FIG. 2*d*.

In FIG. 3, the second method step of the method according to one exemplary specific embodiment of the present invention is illustrated schematically.

Figure 3A:
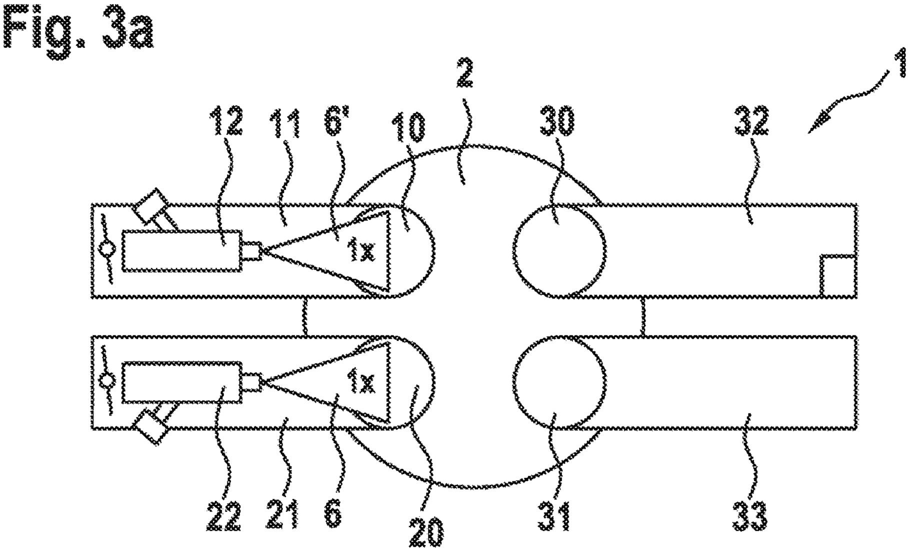
FIG. 3*a* shows a schematic representation of a part of the internal combustion engine, which carries out a second method step of a method according to a specific exemplary embodiment of the present invention.
Figure 3B:
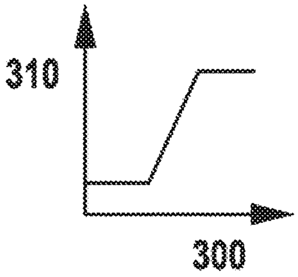
FIG. 3*b* and FIG. 3*c* show the change over time of a deposited fuel quantity.
Figure 3C:
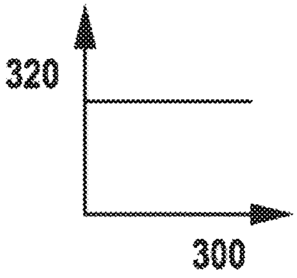
Figure 3D:
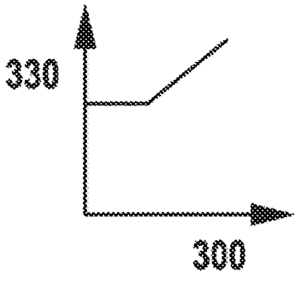
FIG. 3*d* shows the change over time of a lambda value.

In the second method step, first injector 12 is opened again and a first test fuel quantity 6 is injected into first intake pipe 11. First test fuel quantity 6 together with a second test fuel quantity 6', which is injected by second injector 22 into second intake pipe 21, forms a fuel quantity which corresponds to the predetermined fuel quantity from normal operation and the substitute fuel quantity. During the second method step, fuel is again deposited on the first intake pipe wall 11, i.e., the deposition of fuel on the first intake pipe wall 310 increases over time 300. This is illustrated in FIG. 3*b*. FIG. 3*c* shows that the deposition of fuel on the second intake pipe wall 320 remains constant. It is likewise found that, during the second method step, lambda value 330 initially increases over time 300 and subsequently returns to the lambda value of the lambda sensor before the injector is opened. This brief increase and the subsequent decrease of the lambda value are referred to as a lean excursion and are depicted in FIG. 3*d*.

Repeating the first and second method steps under different operating situations makes it possible to determine the difference between the actual fuel quantity and the setpoint fuel quantity of the fuel supplied to the combustion chamber for the particular operating situation.

Knowledge of the deviation from the fuel quantity provided for combustion chamber 2 then makes it possible to correct the predetermined fuel quantity for each operating situation of internal combustion engine 1, i.e., to adapt the transition compensation for the particular operating situation.

What is claimed is:

1. A method for adapting a transition compensation for operation of an internal combustion engine, which includes a combustion chamber having a first inlet opening connected to a first intake pipe, in which a first injector is situated, the combustion chamber having a second inlet opening connected to a second intake pipe, in which a second injector is situated, the method comprising:

injecting a predetermined fuel quantity during normal operation of the internal combustion engine, the predetermined fuel quantity being made up of a first fuel quantity to be injected by the first injector and a second fuel quantity to be injected by the second injector;

in a first test step carried out over a first internal combustion cycle, maintaining the first injector closed while injecting the predetermined fuel quantity by the second injector;

in a second test step carried out over a second internal combustion cycle, injecting a first test fuel quantity by the first injector and injecting a second test fuel quantity by the second injector, wherein the first test fuel quantity and the second test fuel quantity together make up the predetermined fuel quantity;

determining a lambda value change during at least one of: the first test step, or the second test step; and adapting a transition compensation using an operating condition during the normal operation of the internal combustion engine as a function of the determined lambda value change, the adapted transition compensation correcting the predetermined fuel quantity to account for deposition of fuel on walls of the first and second intake pipes.

2. The method of claim 1, wherein during the normal operation of the internal combustion engine, the first fuel quantity injected by the first injector and the second fuel quantity injected by the second injector are equal and/or during the second test step, the first test fuel quantity injected by the first injector and the second test fuel quantity injected by the second injector are equal.

3. The method of claim 1, wherein the lambda value change is determined at a start and/or during a course of the first and/or second test steps.

4. The method of claim 1, wherein the transition compensation is adapted as a function of the determined lambda value change for a plurality of different operating conditions of the internal combustion engine.

5. The method of claim 4, wherein the adapted transition compensation for the plurality of different operating conditions of the internal combustion engine is stored and then taken into account during the normal operation of the internal combustion engine.

6. The method of claim 1, wherein the transition compensation is adapted again for at least one operating condition of the internal combustion engine when a change in emission properties of the internal combustion engine exceeds a predetermined value.

7. The method of claim 1, wherein the transition compensation is adapted again after a predetermined time interval for a plurality of different operating conditions of the internal combustion engine.

8. The method of claim 1, wherein the injected predetermined fuel quantity is controlled by a computer.

* * * * *